United States Patent
Hwang et al.

(10) Patent No.: US 10,304,628 B2
(45) Date of Patent: May 28, 2019

(54) MULTILAYER CAPACITOR AND MANUFACTURING METHOD THEREOF

(71) Applicant: SAMSUNG ELECTRO-MECHANICS CO., LTD., Suwon-si, Gyeonggi-do (KR)

(72) Inventors: Mi Sun Hwang, Suwon-si (KR); Myung Sam Kang, Suwon-si (KR); Dong Keun Lee, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/481,157

(22) Filed: Apr. 6, 2017

(65) Prior Publication Data

US 2018/0090273 A1    Mar. 29, 2018

(30) Foreign Application Priority Data

Sep. 29, 2016  (KR) .................. 10-2016-0125633
Oct. 19, 2016  (KR) .................. 10-2016-0135457

(51) Int. Cl.
*H01G 4/12* (2006.01)
*H01G 4/30* (2006.01)
(Continued)

(52) U.S. Cl.
CPC ............. *H01G 4/248* (2013.01); *H01G 4/012* (2013.01); *H01G 4/1227* (2013.01);
(Continued)

(58) Field of Classification Search
CPC .......... H01G 4/33; H01G 4/012; H01G 4/232; H01G 4/30; H01G 4/12
(Continued)

(56) References Cited

U.S. PATENT DOCUMENTS

2001/0013388 A1*  8/2001  Miyazaki ............ C04B 37/021
                                                                 156/89.12
2005/0214517 A1    9/2005  Sugimoto et al.
(Continued)

FOREIGN PATENT DOCUMENTS

JP    H09-129476 A    5/1997
JP    2002-184638 A    6/2002
(Continued)

OTHER PUBLICATIONS

Notice of Office Action for Korean Patent Application No. 10-2016-01365457, dated Apr. 5, 2018 (English translation).

*Primary Examiner* — Michael P McFadden
(74) *Attorney, Agent, or Firm* — Morgan Lewis & Bockius LLP

(57) ABSTRACT

A multilayer capacitor includes a body including dielectric layers and first and second internal electrodes alternately disposed with dielectric layers interposed therebetween. First and second external electrodes are on the body and connected to the first and second internal electrodes, respectively. The first and second internal electrodes are plating layers. A manufacturing method of a multilayer capacitor includes preparing a plurality of laminated sheets including internal electrodes, dummy electrodes, and dielectric layers. The plurality of laminated sheets, and covers on and below the laminated sheets, are simultaneously stacked and then cured to prepare a cured product. The cured product is then diced depending on the size of the capacitor to prepare a body where the internal electrodes and the dummy electrodes are partially exposed. External electrodes are formed on external surfaces of the body using the dummy electrodes as seeds in a plating method.

16 Claims, 16 Drawing Sheets

(51) Int. Cl.
  *H01G 4/012* (2006.01)
  *H01G 4/232* (2006.01)
  *H01G 4/248* (2006.01)

(52) U.S. Cl.
  CPC ........... *H01G 4/232* (2013.01); *H01G 4/2325* (2013.01); *H01G 4/30* (2013.01); *H01G 4/308* (2013.01); *H01G 4/12* (2013.01); *H01G 4/1236* (2013.01); *Y02E 60/13* (2013.01)

(58) Field of Classification Search
  USPC ...................................................... 361/301.4
  See application file for complete search history.

(56) References Cited

U.S. PATENT DOCUMENTS

| | | | | |
|---|---|---|---|---|
| 2008/0030922 | A1* | 2/2008 | Hidaka | H01G 4/232 361/303 |
| 2009/0310278 | A1 | 12/2009 | Tani | |
| 2012/0320495 | A1* | 12/2012 | Akazawa | H01G 4/30 361/321.2 |
| 2013/0020905 | A1* | 1/2013 | Sawada | H01G 4/30 310/311 |
| 2014/0240895 | A1* | 8/2014 | Lee | H01G 4/12 361/301.4 |
| 2014/0293503 | A1 | 10/2014 | Sasabayashi et al. | |
| 2015/0008024 | A1* | 1/2015 | Park | H01G 4/01 174/260 |
| 2017/0169954 | A1* | 6/2017 | Ota | H01G 4/012 |

FOREIGN PATENT DOCUMENTS

| | | |
|---|---|---|
| JP | 2002-329634 A | 11/2002 |
| JP | 2005-285801 A | 10/2005 |
| JP | 2010-021523 A | 1/2010 |
| JP | 2016-171181 A | 9/2016 |
| KR | 10-2014-0106021 A | 9/2014 |
| KR | 10-1640534 B1 | 7/2016 |

* cited by examiner

MULTILAYER CAPACITOR AND MANUFACTURING METHOD THEREOF

CROSS-REFERENCE TO RELATED APPLICATION(S)

This application claims benefit of priority to Korean Patent Application Nos. 10-2016-0125633 filed on Sep. 29, 2016 and 10-2016-0135457 filed on Oct. 19, 2016 in the Korean Intellectual Property Office, the disclosure of which is incorporated herein by reference in its entirety.

BACKGROUND

1. Field

The present disclosure relates to a multilayer capacitor and a manufacturing method thereof.

2. Description of Related Art

Multilayer capacitors commonly have a small size, high capacitance, and are easily mounted.

A multilayer capacitor is mounted on a board of several electronic products such as imaging devices, for example, liquid crystal displays (LCD), plasma display panels (PDP), or the like, computers, smartphones, cellular phones, and the like, and serve to charge or discharge electricity thereto or therefrom.

Recently, the mounting interval of the board has tended to decrease due to an increased integration of a pulse amplitude modulation (PAM) module, and thus, miniaturization of multilayer capacitors has been required.

Due to an increase in frequency band in electronic products, it is difficult to match impedance with the multilayer capacitor, and there is an increased demand for a multilayer capacitor with a high-quality factor (Q) and a narrow deviation.

A product with a narrow deviation, within ±0.1 pF (hereinafter, referred to as a "B deviation"), occupies two-thirds or more of the entire market and is more expensive than a product with general deviation.

In a multilayer capacitor according to the related art, internal electrodes are formed using a printing method.

However, it is difficult to implement a narrow deviation to capacitance of the capacitor due to a thickness deviation of the internal electrodes and a printing alignment deviation generated during a printing process.

To obtain a product with the B deviation (±0.1 pF), the capacitance of the completed multilayer capacitors are measured and only those capacitors with a capacitance deviation within ±0.1 pF are selected and released. As such, a yield can be less than 50% based on a B deviation of a 0402-sized product, for example.

Therefore, price competitiveness of the product may be decreased, and in a low-capacitance capacitor, it is difficult to obtain the 0.1 pF interval required in a high-frequency multilayer capacitor.

In the multilayer capacitor according to the related art, external electrodes are formed by printing a solder paste. However, when the size of the multilayer capacitor is decreased, for example, from 0402 size to 0201 size, it is more difficult to form the external electrodes, such that a short circuit problem may occur due to misprinting of the solder paste when applying surface mounting technology (SMT).

SUMMARY

An aspect of the present disclosure may provide a multilayer capacitor, and a manufacturing method thereof, capable of easily controlling area distribution and thickness distribution of dielectric layers to implement capacitance with a narrow deviation as compared to a multilayer capacitor according to the related art. The multilayer capacitor of the present disclosure may be capable of solving a short circuit problem at the time of applying a surface mounting technology (SMT).

According to an aspect of the present disclosure, a multilayer capacitor may include a body including dielectric layers and first and second internal electrodes alternately stacked with dielectric layers interposed therebetween. First and second external electrodes may be disposed on the body and connected to the first and second internal electrodes, respectively. The first and second internal electrodes may be plating layers.

The body may be formed by simultaneously stacking the dielectric layers and the first and second internal electrodes.

The first and second external electrodes may be include plating layers.

The multilayer capacitor may further include a plurality of dummy electrodes in the body, exposed at at least one surface of the body, and connected to the first and second external electrodes, respectively.

The body may include an active region including the first and second internal electrodes and covers on outermost portions of the active region. The multilayer capacitor may further include a plurality of dummy electrodes in the covers, exposed at at least one surface of the body, and connected to the first and second external electrodes, respectively.

The body may have first and second surfaces opposing each other, third and fourth surfaces connected to the first and second surfaces and opposing each other, and fifth and sixth surfaces connected to the first and second surfaces and the third and fourth surfaces and opposing each other. The first and second internal electrodes may be exposed at the third and fourth surfaces, respectively. The first external electrode may extend from the third surface to portions of the first and second surfaces and portions of the fifth and sixth surfaces and be connected to the exposed end portions of the first internal electrodes. The second external electrode may extend from the fourth surface to portions of the first and second surfaces and portions of the fifth and sixth surfaces and be connected to the exposed end portions of the second internal electrodes.

The multilayer capacitor may further include: a first dummy electrode on the dielectric layer on which the first internal electrode is disposed and exposed at at least one of the fourth, fifth, and sixth surfaces; a third dummy electrode on the dielectric layer on which the first internal electrode is disposed and exposed at third or fifth surface; a fourth dummy electrode on the dielectric layer on which the first internal electrode is disposed and exposed at the third or sixth surface; a second dummy electrode on the dielectric layer on which the second internal electrode is disposed and exposed at at least one of the third, fifth, and sixth surfaces; a fifth dummy electrode on the dielectric layer on which the second internal electrode is disposed and exposed at the fourth or fifth surface; a sixth dummy electrode formed on the dielectric layer on which the second internal electrode is disposed and exposed at the fourth or sixth surface.

The first external electrode may extend from the third surface to portions of the first and second surfaces and be connected to the exposed end portions of the first internal electrodes. The second external electrode may extend from the fourth surface to portions of the first and second surfaces and be connected to the exposed end portions of the second internal electrodes.

The multilayer capacitor may include: a first dummy electrode exposed at the fourth surface on the dielectric layer on which the first internal electrode is disposed; and a second dummy electrode exposed at a third surface on the dielectric layer on which the second internal electrode is disposed.

The first internal electrode may have a first lead portion exposed at the first and third surfaces. The second internal electrode may have a second lead portion exposed at the first and fourth surfaces. The first external electrode may extend from the first surface to a portion of the third surface and be connected to the first lead portion. The second external electrode may be on the first surface spaced apart from the first external electrode, extend from the first surface to a portion of the fourth surface, and connect to the second lead portion.

The multilayer capacitor may further include: a first dummy electrode exposed at the first and fourth surfaces on the dielectric layer on which the first internal electrode is disposed; and a second dummy electrode exposed at the first and third surfaces on the dielectric layer on which the second internal electrode is disposed.

According to another aspect of the present disclosure, a multilayer capacitor may include: a body including a plurality of laminated sheets and a cover disposed on at least one of upper and lower portions of the laminated sheets. External electrodes may be on external surfaces of the body. The laminated sheet may include a dielectric layer and an internal electrode that is a plating layer.

The body may be formed by simultaneously stacking the plurality of laminated sheets and the cover.

The first and second external electrodes may each include a plating layer.

The laminated sheet may further include a plurality of dummy electrodes spaced apart from the internal electrodes with dielectric layers interposed therebetween. The dummy electrodes may be plating layers, exposed at at least one surface of the body, and connected to the first and second external electrodes, respectively.

The cover may further include a plurality of dummy electrodes that are plating layers. The dummy electrodes are exposed at at least one surface of the body and are connected to the first and second external electrodes, respectively.

The first external electrode may extend from the third surface to portions of the first and second surfaces and portions of the fifth and sixth surfaces and be connected to the exposed end portions of the first internal electrodes. The second external electrode may extend from the fourth surface to portions of the first and second surfaces and portions of the fifth and sixth surfaces and be connected to the exposed end portions of the second internal electrodes.

The multilayer capacitor may further include: a first dummy electrode exposed at at least one of the fourth, fifth, and sixth surfaces on the laminated sheet on which the first internal electrode is disposed; a third dummy electrode exposed at third or fifth surface on the laminated sheet on which the first internal electrode is disposed; a fourth dummy electrode exposed at the third or sixth surface on the laminated sheet on which the first internal electrode is disposed; a second dummy electrode exposed at at least one of the third, fifth, and sixth surfaces on the laminated sheet on which the second internal electrode is disposed; a fifth dummy electrode exposed at the fourth or fifth surface on the laminated sheet on which the second internal electrode is disposed; and a sixth dummy electrode exposed at the fourth or sixth surface on the laminated sheet on which the second internal electrode is disposed.

The first external electrode may extend from the third surface to portions of the first and second surfaces and be connected to the exposed end portions of the first internal electrodes. The second external electrode may extend from the fourth surface to portions of the first and second surfaces and be connected to the exposed end portions of the second internal electrodes.

The multilayer capacitor may further include: a first dummy electrode on the laminated sheet on which the first internal electrode is disposed and exposed at the fourth surface; and a second dummy electrode exposed at a third surface on the laminated sheet on which the second internal electrode is disposed.

The first internal electrode may have a first lead portion exposed at the first and third surfaces. The second internal electrode may have a second lead portion exposed at the first and fourth surfaces. The first external electrode may extend from the first surface to a portion of the third surface and be connected to the first lead portion. The second external electrode may be on the first surface spaced apart from the first external electrode, extend from the first surface to a portion of the fourth surface, and be connected to the second lead portion.

The multilayer capacitor may further include: a first dummy electrode on the laminated sheet on which the first internal electrode is disposed and exposed at the first and fourth surfaces; and a second dummy electrode on the laminated sheet on which the second internal electrode is disposed and exposed at the first and third surfaces.

According another aspect of the present disclosure, a manufacturing method of a multilayer capacitor may include: preparing a plurality of laminated sheets including internal electrodes, dummy electrodes, and dielectric layers; simultaneously stacking, and then curing, the plurality of laminated sheets, and covers on and below the laminated sheets, to prepare a cured product; dicing the cured product depending on a size of the capacitor to prepare a body where the internal electrodes and the dummy electrodes are partially exposed; and forming external electrodes on external surfaces of the body using the dummy electrodes as seeds in a plating method.

The preparing of the laminated sheets may include: patterning the internal electrodes and the dummy electrodes on a surface of copper foil by a lithography method and a plating method; forming the dielectric layer to cover the internal electrodes and the dummy electrodes; and removing the copper foil.

The preparing of the laminated sheets may further include, after the forming of the dielectric layer, controlling a viscosity of the dielectric layer.

The preparing of the laminated sheets may further include, before the removing of the copper foil, forming a mask layer to cover the dielectric layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Directions of a body 110 will be defined in order to clearly describe exemplary embodiments in the present disclosure. X, Y, and Z illustrated in the accompanying drawings denote a length direction of the body, a width direction of the body, and a thickness direction of the body, respectively. The thickness direction may be the same as a stacking direction in which dielectric layers and internal electrodes are stacked.

Multilayer Capacitor

Figure 1:
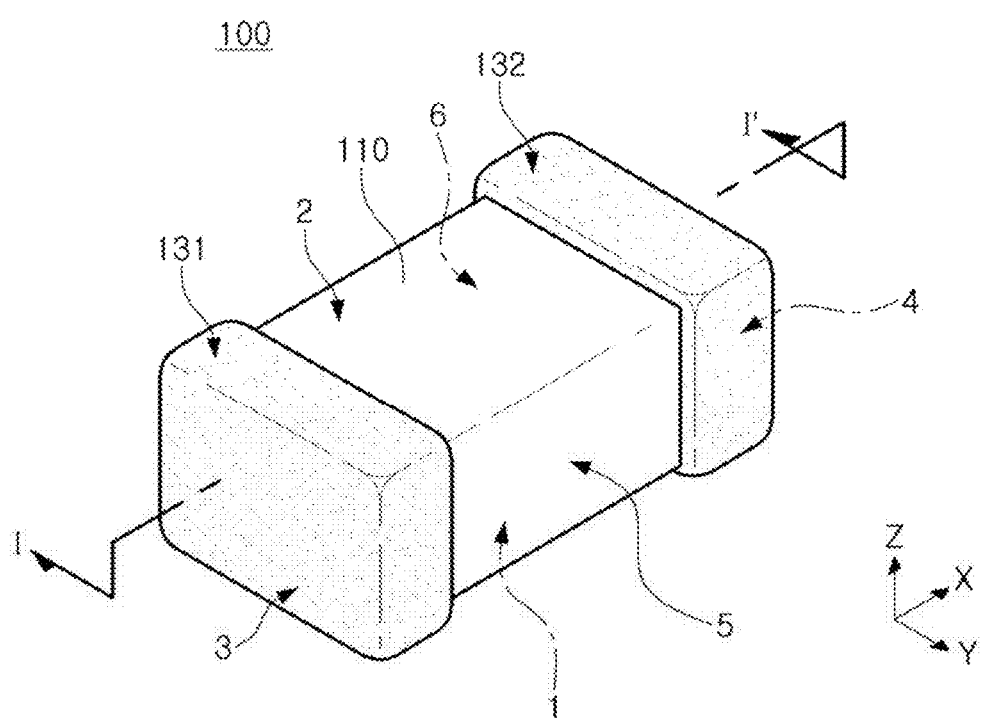
FIG. 1 is a perspective view schematically illustrating a multilayer capacitor according to an exemplary embodiment in the present disclosure.
Figure 2A:
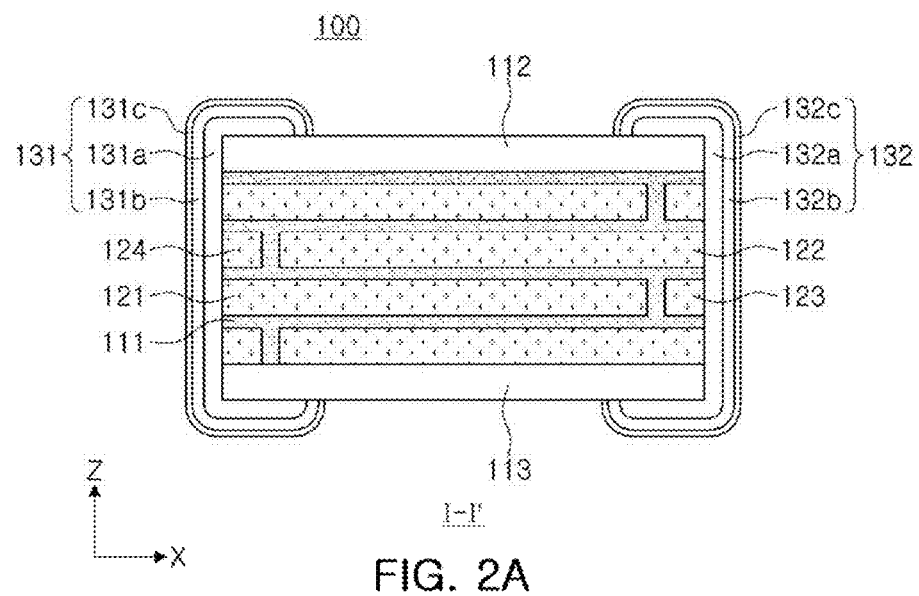
FIG. 2A is a cross-sectional view taken along line I-I' of FIG. 1.
Figure 3A:
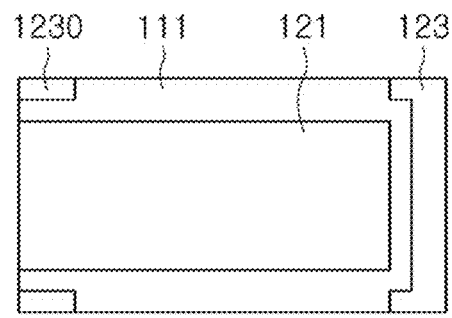
FIGS. 3A through 3C are plan views illustrating structures of first and second internal electrodes and first and second dummy electrodes in the multilayer capacitor of FIG. 1.
Figure 3B:
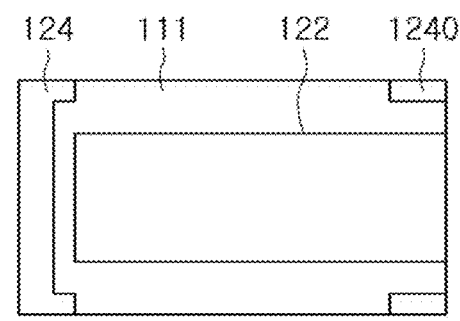
Figure 3C:
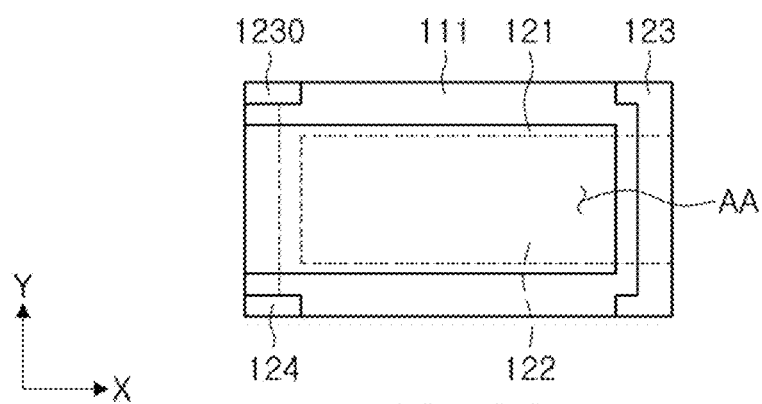

FIG. 1 is a perspective view schematically illustrating a multilayer capacitor according to an exemplary embodiment in the present disclosure. FIG. 2A is a cross-sectional view taken along line I-I' of FIG. 1. FIGS. 3A through 3C are plan views illustrating structures of first and second internal electrodes and first dummy electrodes in the multilayer capacitor of FIG. 1.

Referring to FIGS. 1, 2A, and 3A through 3C, a multilayer capacitor 100 according to the present exemplary embodiment may include a body 110 and first and second external electrodes 131 and 132.

The body 110 may be formed by simultaneously stacking dielectric layers 111 and first and second internal electrodes 121 and 122. The body 110 may include an active region including a plurality of dielectric layers 111 stacked in the Z direction and a plurality of first and second internal electrodes 121 and 122 alternately stacked with dielectric layers 111 interposed therebetween in the Z direction. Covers 112 and 113 may be disposed on and below the active region.

The body 110 as described above may be formed by stacking the plurality of dielectric layers 111 and first and second internal electrodes 121 and 122 in the Z direction. The shape of the body 110 is not particularly limited, but may have a substantially hexahedral shape as illustrated in the accompanying drawings.

The body 110 may have first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2 and the third and fourth surfaces 3 and 4 and opposing each other in the Y direction.

Hereinafter, in the present exemplary embodiment, a description will be provided on the assumption that amounting surface of the multilayer capacitor 100 is the first surface 1 of the body 110.

The dielectric layers 111 may be in a cured state, and adjacent dielectric layers 111 may be integrated with each other so that boundaries therebetween are not readily apparent without a scanning electron microscope (SEM).

The dielectric layer may have a dielectric constant (Dk) of 3 to 50, a dissipation factor (Df) of 0.01 to 0.001, and a thickness distribution with a standard deviation (std) of 0.65 μm or so. The thickness of the dielectric layer 111 may be selected based on the capacitance design of the multilayer capacitor 100.

The dielectric layer 111 may contain ceramic powder particles having a high dielectric constant, for example, barium titanate ($BaTiO_3$) based powder particles, strontium titanate ($SrTiO_3$) based powder particles, magnesium titanate, $CaZrO_3$, $(Ca,Sr)(Ti,Zr)O_3$, $BaO-TiO_2-Nd_2O_3$, $CaTiO_3-MgTiO_3$, or the like, and a resin. However, the material of the dielectric layer 111 is not limited thereto as long as a sufficient capacitance may be obtained.

An epoxy, active ester, cyanate ester, acrylate, or the like, may be used as the resin.

The covers 112 and 113 may be disposed on both outermost portions of the active region in the Z directions, respectively, as margins of the body 110 in the Z direction.

The covers 112 and 113 may be formed of the same material as that of the dielectric layers 111 and have the same configuration as that of the dielectric layers 111 except that they do not include internal electrodes. However, the material and configuration of the covers 112 and 113 may be different from those of the dielectric layers 111.

The covers 112 and 113 as described above may be formed by stacking one or more dielectric layers on both outermost portions of the body 110, respectively, in the Z direction, and may serve to prevent the first and second internal electrodes 121 and 122 from being damaged by physical or chemical stress.

The first and second internal electrodes 121 and 122 are electrodes applied with different polarities and may be alternately stacked in the body 110 with dielectric layers 111 interposed therebetween in the Z direction so that the first and second internal electrodes 121 and 122 face each other and end portions thereof are alternately exposed at the third and fourth surfaces 3 and 4 of the body 110.

The first and second internal electrodes 121 and 122 may be electrically insulated from each other by the dielectric layer 111 disposed therebetween.

The dielectric characteristics of the multilayer capacitor 100 may be formed by an overlapping area AA between the first and second internal electrodes 121 and 122 in the Z direction.

In the present exemplary embodiment, in order to allow an interlayer align of the first and second internal electrodes 121 and 122 to be within ±10 μm, the first internal electrode 121 may be formed to be 10 μm larger than the second internal electrode 122 in one direction. Therefore, in all of the layers of the body 110, the interlayer align may be within ±10 μm, such that a capacitance deviation of the multilayer capacitor 100 may be controlled to be within ±1.7%.

The first and second internal electrodes 121 and 122 may be formed of copper (Cu), but the material of the first and second internal electrodes 121 and 122 is not limited thereto.

According to the present exemplary embodiment, the first and second internal electrodes 121 and 122 may be formed by attaching copper to the dielectric layers 111 using a litho & plating method.

As compared to internal electrodes formed using a printing method according to the related art, the contours of the first and second internal electrodes 121 and 122 may be clearly defined, and the multilayer capacitor may have excellent characteristics in view of area distribution and coverage of the internal electrodes.

The first and second external electrodes 131 and 132 may be disposed on the third and fourth surfaces of the body 110 in the X direction and contact the exposed end portions of the first and second internal electrodes 121 and 122 to be electrically connected thereto, respectively.

The first and second external electrodes 131 and 132 may respectively include first and second conductive layers 131a and 132a formed on the third and fourth surfaces 3 and 4 of the body 110.

First and second plating layers may be formed on the first and second conductive layers 131a and 132a, respectively. The first and second plating layers may respectively include nickel (Ni) plating layers 131b and 132b and tin (Sn) plating layers 131c and 132c formed on the nickel (Ni) plating layers 131b and 132b, respectively.

According to the present exemplary embodiment, the first and second external electrodes 131 and 132 may respectively include connection portions formed on the third and fourth surfaces 3 and 4 of the body 110 and first and second band portions extended from the respective connection portions to portions of the fifth and sixth surfaces 5 and 6 of the body 110 in the Y direction and portions of the first and second surfaces 1 and 2 of the body 110 in the Z direction, respectively.

According to the present exemplary embodiment, the first and second conductive layers 131a and 132a may be formed by an electroplating method. The first and second conductive layers 131a and 132a may be formed of copper (Cu), but the material of the first and second conductive layers 131a and 132a is not limited thereto.

In order to form the first and second conductive layers 131a and 132a using the electroplating method as described above, a seed is required.

According to the present exemplary embodiment, a first dummy electrode 123 may be disposed on the dielectric layer 111 on which the first internal electrode 121 is disposed, and a second dummy electrode 124 may be disposed on the dielectric layer 111 on which the second internal electrode 122 is disposed.

The first and second dummy electrodes 123 and 124 may be disposed to be spaced apart from the first and second internal electrodes 121 and 122, and disposed to be exposed at the fourth and third surfaces 4 and 3 of the body 110 opposing surfaces to which the first and second internal electrodes 121 and 122 are exposed, respectively.

Therefore, the first and second dummy electrodes 123 and 124 may serve as seed layers for forming the first and second conductive layers 131a and 132a using the electroplating method.

The first and second dummy electrodes 123 and 124 may extend from the fourth and third surfaces 4 and 3 of the body 110 to portions of the fifth and sixth surfaces 5 and 6, respectively.

The first and second dummy electrodes 123 and 124 may be formed together with the internal electrodes at the time of patterning the internal electrodes.

The distance between the seeds, that is, the interval between the first and second internal electrodes 121 and 122 adjacent to the first and second dummy electrodes 123 and 124 in the Z direction may be 10 μm or less in consideration of a plating spreading phenomenon that occurs during electroplating. That is, a thickness of the dielectric layer 110 may be 10 μm or less.

There may also be a pair of third dummy electrodes 1230 on the dielectric layer 111 on which the first internal electrode 121 is disposed. The pair of third dummy electrodes 1230 may be in both margins of the dielectric layer 111 in the width direction and at the side at which the first internal electrode 121 is exposed. There may also be a pair of fourth dummy electrodes 1240 on the dielectric layer 111 on which the second internal electrode 122 is disposed. The pair of fourth dummy electrodes 1240 may be in both margins of the dielectric layer 111 in the width direction and at the side at which the second internal electrode 122 is exposed.

The third and fourth dummy electrodes 1230 and 1240 may be exposed at the third and fourth surfaces of the body 110. The third and fourth dummy electrodes 1230 and 1240 may also be exposed at portions of the fifth and sixth surfaces 5 and 6 of the body 110.

Figure 2B:
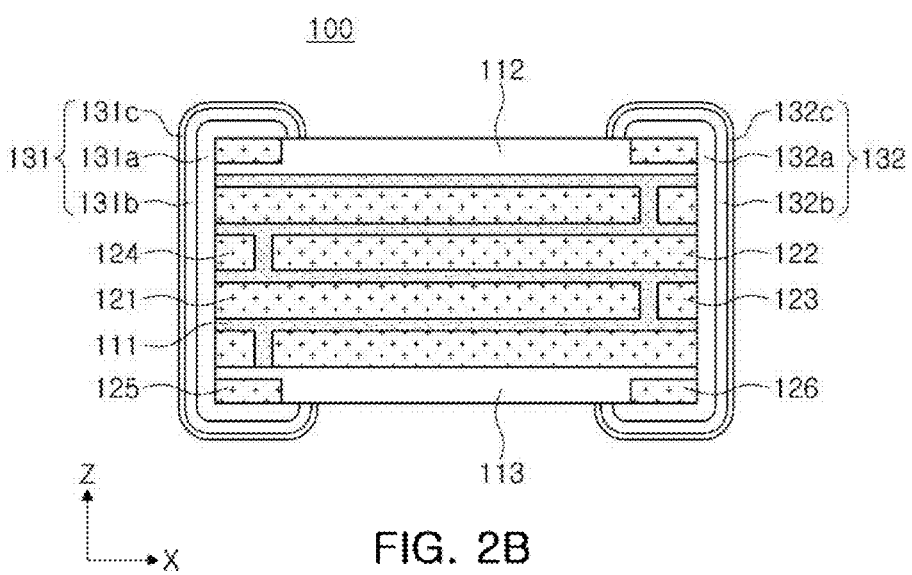
FIG. 2B is a cross-sectional view illustrating another exemplary embodiment with third and fourth dummy electrodes included in the multilayer capacitor of FIG. 2A.

As illustrated in FIG. 2B, there may also be fifth and sixth dummy electrodes 125 and 126 in the covers 112 and 113. The fifth and sixth dummy electrodes 125 and 126 may be exposed at the third and fourth surfaces 3 and 4 of the body 110, respectively. The fifth and sixth dummy electrodes 125 and 126 may be exposed at portions of the fifth and sixth surfaces 5 and 6 of the body 110.

Figure 4A:
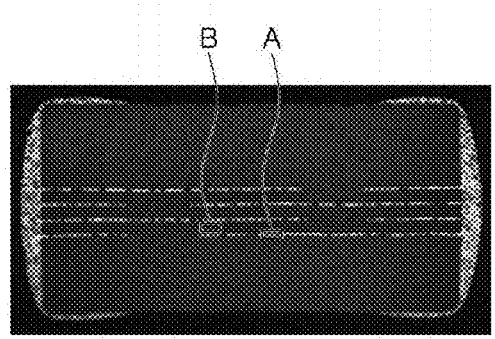
FIGS. 4A and 4B are cross-sectional images of a multilayer capacitor having internal electrodes formed by a screen printing method according to the related art.
Figure 4B:
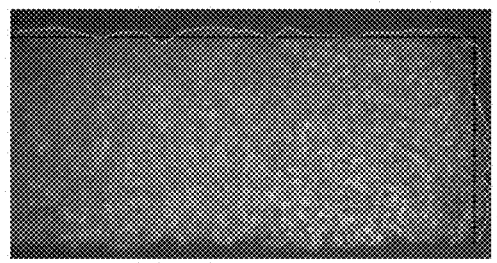
Figure 4C:
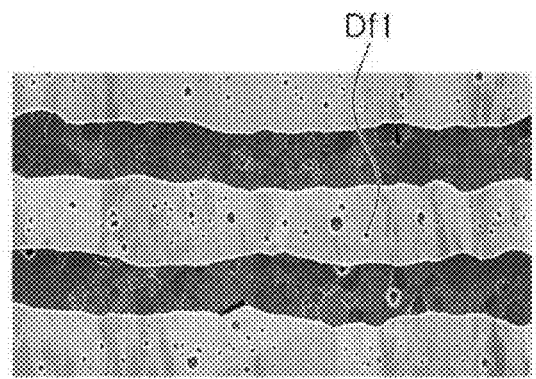
FIG. 4C is an enlarged image of part A of FIG. 4A.
Figure 4D:
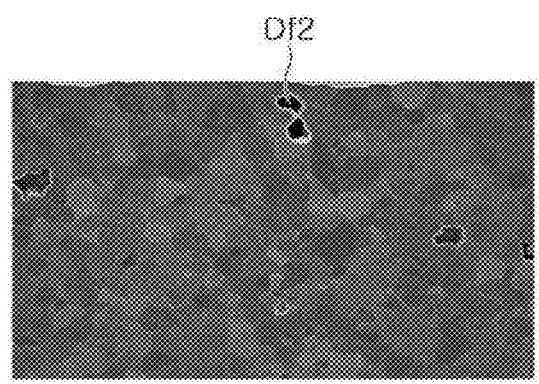
FIG. 4D is an enlarged image of part B of FIG. 4A.

FIGS. 4A and 4B are cross-sectional images of a multilayer capacitor having internal electrodes formed by a screen printing method according to the related art. FIG. 4C is an enlarged image of part A of FIG. 4A. FIG. 4D is an enlarged image of part B of FIG. 4A.

Referring to FIGS. 4A through 4D, in the multilayer capacitor having the internal electrodes formed by the screen printing method according to the related art, defects Df1 and Df2 may occur in internal electrodes and dielectric layers, respectively. The thickness and shape of the internal electrodes are adjusted by adjusting the thickness and shape of the paste at the time of screen printing, but an edge spreading phenomenon of the internal electrode may occur due to a printing error and compression/sintering fixation.

Therefore, thickness distribution of the internal electrodes and dielectric layers may have a standard deviation (std) of 0.95 µm or so. Generally, in the multilayer capacitor having internal electrodes formed by a screen printing method, the diameter of the defect in the internal electrode may be 5.6 µm on average, and may be in a range of at least 3.1 µm to at most 9.4 µm or so. Furthermore, in this case a roughness Ra of the internal electrode may be 0.15 µm or more.

Figure 5A:
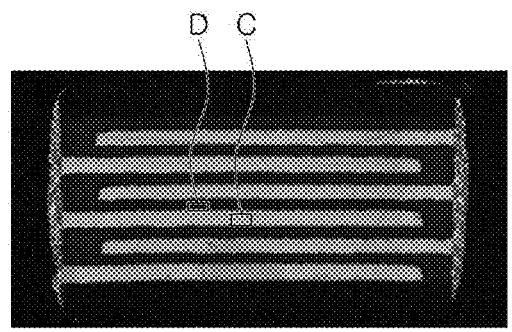
FIGS. 5A and 5B are cross-sectional images illustrating internal electrodes of a multilayer capacitor according to an exemplary embodiment in the present disclosure.
Figure 5B:
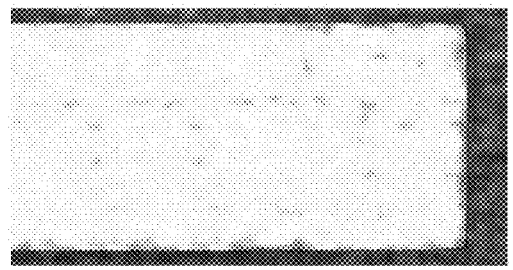
Figure 5C:
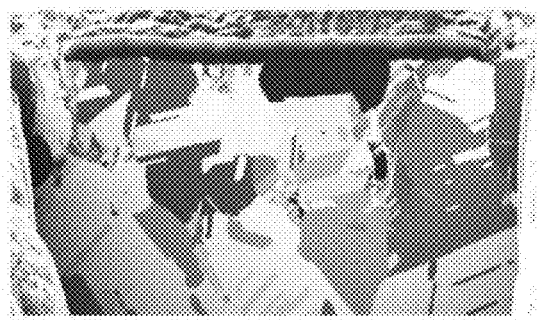
FIG. 5C is an enlarged image of part C of FIG. 5A.
Figure 5D:
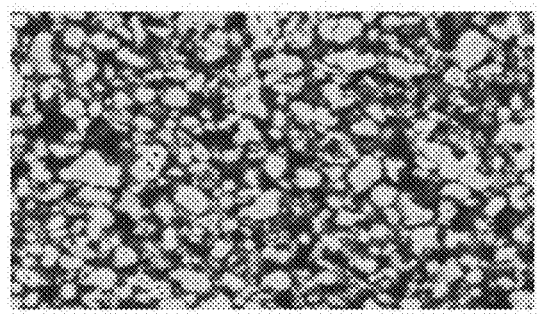
FIG. 5D is an enlarged image of part D of FIG. 5A.

FIGS. 5A and 5B are cross-sectional images illustrating internal electrodes of a multilayer capacitor according to an exemplary embodiment in the present disclosure. FIG. 5C is an enlarged image of part C of FIG. 5A. FIG. 5D is an enlarged image of part D of FIG. 5A.

Referring to FIGS. 5A through 5D, since the multilayer capacitor according to the present exemplary embodiment has internal electrodes formed by an electroplating method, there is no defect in the internal electrodes and the dielectric layers, and the edge spreading phenomenon of the internal electrode does not occur.

Therefore, the internal electrode may be formed in a range in which the resolution of the exposure device is within ±1 µm, and the thickness distribution of the internal electrodes and dielectric layers may have a standard deviation (std) of 0.65 µm or so, such that a capacitance deviation of the multilayer capacitor may be controlled within ±7%. Furthermore, in this case a roughness Ra of the internal electrode may be 0.05 µm or less. It may be appreciated that a surface of the internal electrode according to the present exemplary embodiment becomes planarized as compared to the internal electrode according to the related art.

Because the multilayer capacitor according to the present exemplary embodiment is formed by a simultaneous stacking method of stacking each of the layers at once, there is no cumulative deformation by sequential stacking, and all of the layers may be formed so that an align is within ±10 µm, regardless of the number of layers.

Since dielectric characteristics are formed by an overlapping area between the first and second internal electrodes, the dielectric characteristics may be affected by interlayer align process capability. When alignment of the all of the layers is within ±10 µm due to influences by alignment as in the present exemplary embodiment, the capacitance deviation of the multilayer capacitor may be controlled to be within at most ±1.7% or so.

Because internal electrodes and alignment pattern marks are simultaneously formed in an interlayer align method, the alignment pattern marks may represent 100% of the internal electrodes.

When external electrodes are formed by an electroplating method as in the present exemplary embodiment, the size of the capacitor may be decreased. Therefore, the electroplating method is advantageous in forming external electrodes of a small sized capacitor.

Modified Exemplary Embodiment

Although a 2-terminal multilayer capacitor with external electrodes formed in a cap shape on opposing end surfaces of a body in a length direction is described in the present exemplary embodiment, the multilayer capacitor is not limited thereto.

Figure 15:
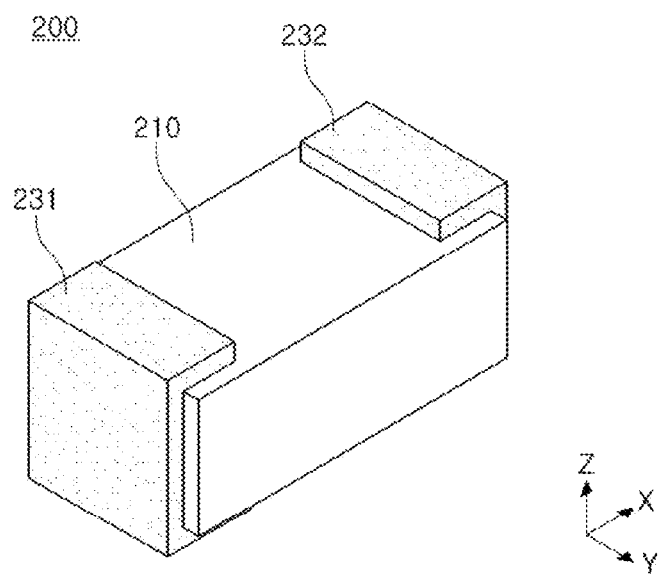
FIG. 15 is a perspective view schematically illustrating a multilayer capacitor according to another exemplary embodiment in the present disclosure.
Figure 16A:
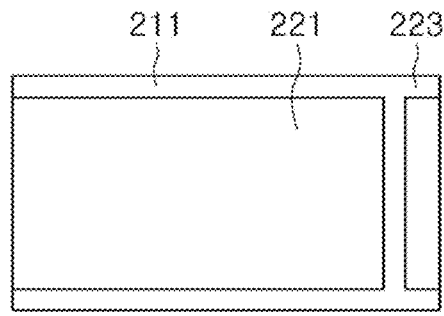
FIGS. 16A through 16C are plan views illustrating structures of first and second internal electrodes and first and second dummy electrodes in the multilayer capacitor of FIG. 15.
Figure 16B:
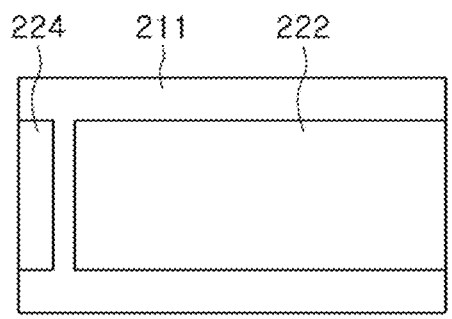
Figure 16C:
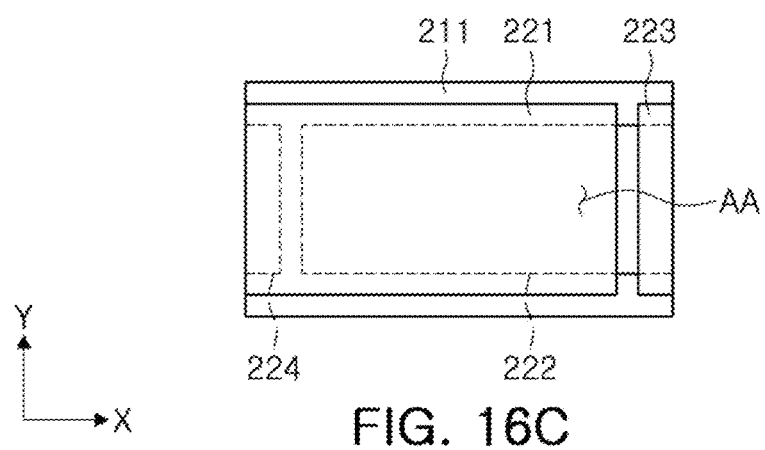

FIG. 15 is a perspective view schematically illustrating a multilayer capacitor according to another exemplary embodiment in the present disclosure. FIGS. 16A through 16C are plan views illustrating structures of first and second internal electrodes and first and second dummy electrodes in the multilayer capacitor of FIG. 15.

In a multilayer capacitor 200 according to the present exemplary embodiment, a body 210 is formed by alternately disposing first and second internal electrodes 221 and 222 in a width direction of the body 210 with dielectric layers interposed therebetween. First and second external electrodes 231 and 232 may be formed in a "C" shape on both ends of the body 210 in a length direction.

In order to form the first and second external electrodes 231 and 232 in the "C" shape, a first dummy electrode 223 may be on the dielectric layer on which the first internal electrode 221 is disposed. The first dummy electrode 223 may be spaced apart from the first internal electrode 221 and exposed at the other surface of the body 210 opposing one surface thereof at which the first internal electrode 221 is exposed in the length direction. A second dummy electrode 224 may be on the dielectric layer on which the second internal electrode 222 is disposed. The second dummy electrode 224 may be spaced apart from the second internal electrode 222 and exposed at one surface of the body 220 opposing the other surface thereof at which the second internal electrode 222 is exposed in the length direction. The first and second dummy electrodes 223 and 224 may serve as seed layers for forming the first and second external electrodes 231 and 232, respectively.

According to the present exemplary embodiment, the first and second internal electrodes 221 and 222 and the first and second dummy electrodes 223 and 224 are not exposed at either surfaces of the body 210 in the width direction.

Figure 17:
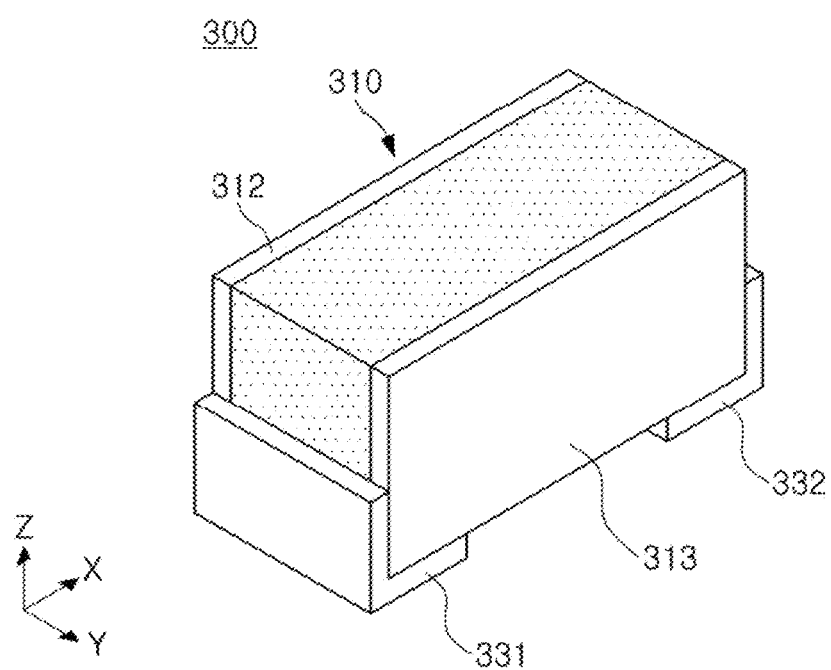
FIG. 17 is a perspective view schematically illustrating a multilayer capacitor according to another exemplary embodiment in the present disclosure.
Figure 18A:
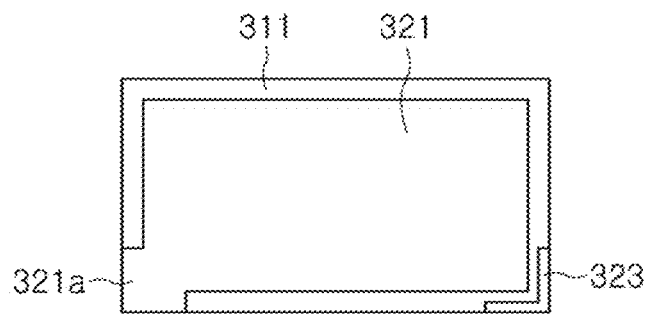
FIGS. 18A through 18C are plan views illustrating structures of first and second internal electrodes and first and second dummy electrodes in the multilayer capacitor of FIG. 17.
Figure 18B:
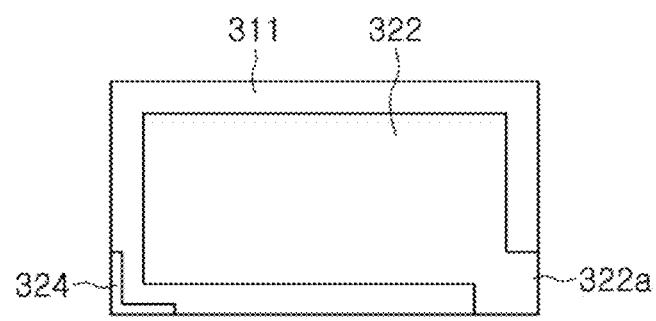
Figure 18C:
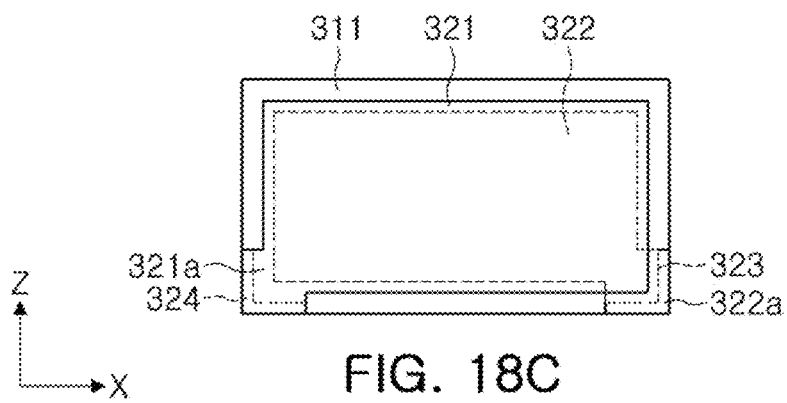

FIG. 17 is a perspective view schematically illustrating a multilayer capacitor according to another exemplary embodiment in the present disclosure. FIGS. 18A through 18C are plan views illustrating structures of first and second internal electrodes and first and second dummy electrodes in the multilayer capacitor of FIG. 17.

Referring to FIGS. 17 through 18C, in a multilayer capacitor 300 according to the present exemplary embodiment, first and second external electrodes 331 and 332 may be formed in an "L" shape.

The "L" shaped first external electrode 331 may extend from at least a portion of one end surface of a body 310 in a length direction to at least a portion of one end surface of the body 310 in a thickness direction, that is, a mounting surface of the body 310. The L-shaped second external electrode 332 may extend from at least a portion of the opposing end surface of the body 310 in the length direction to at least a portion of the mounting surface of the body 310.

First and second internal electrodes 321 and 322 may have first and second lead portions 321a and 322a exposed at corners corresponding to the mounting surface of the body 310 and the respective opposing end surfaces of the body 310 in the length direction.

First and second dummy electrodes 323 and 324 may be formed at the corners opposing the first and second lead portions 321a and 322a in the length direction, respectively, so as not to contact the respective first and second internal electrodes 321 and 322.

Figure 19:
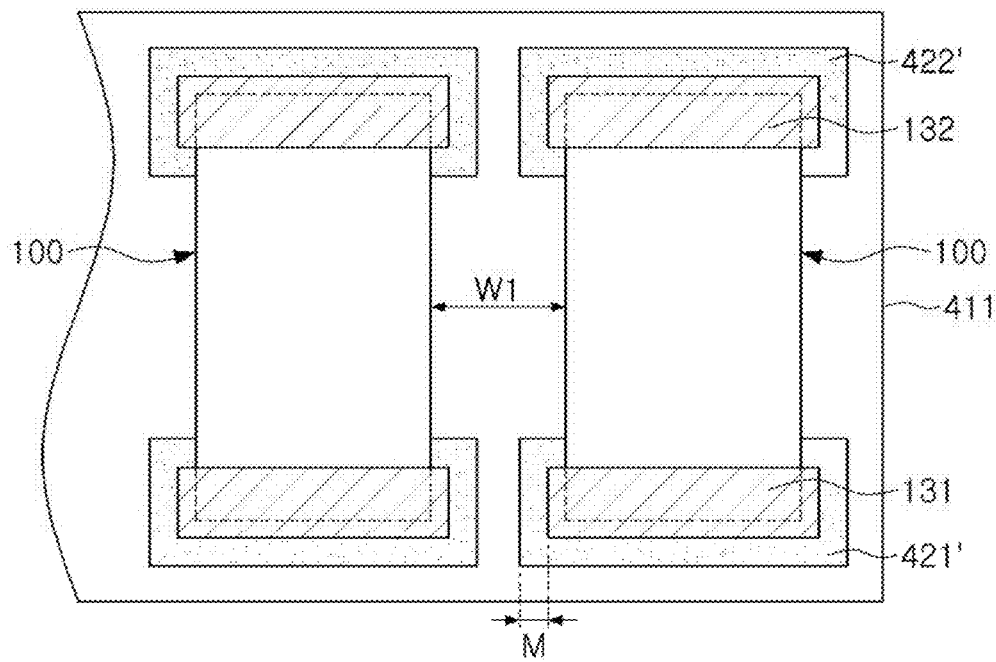
FIG. 19 is a plan view illustrating a board in which a multilayer capacitor according to the exemplary embodiment in the present disclosure is mounted on a circuit board.
Figure 20:
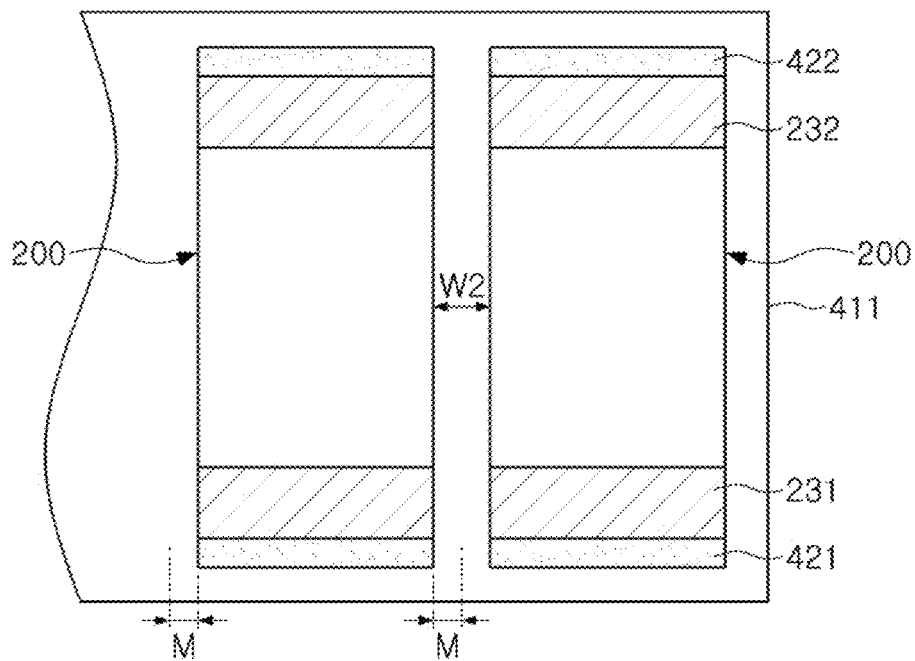
FIG. 20 is a plan view illustrating a board in which a multilayer capacitor according to another exemplary embodiment in the present disclosure is mounted on a circuit board.

Referring to FIGS. 19 and 20, when the external electrodes are formed in the "C" shape or "L" shape as described above, because the external electrodes are not formed on either side surfaces of the body in the width direction, the area taken up by the electrode pads of the board may be decreased, such that a mounting area of the capacitor may be decreased. Thus, an interval between components may be decreased. Therefore, the components can be highly integrated, and at the time of mounting the capacitor on the board, the occurrence rate of short circuits by misprinting the solder can be decreased.

Manufacturing Method of Multilayer Capacitor

FIGS. 6 through 14 are cross-sectional views sequentially illustrating a manufacturing method of the multilayer capacitor according to the present disclosure.

Hereinafter, an example of the manufacturing method of the multilayer capacitor according to the exemplary embodiment of the present disclosure, having the above-mentioned structure will be described with reference to FIGS. 6 through 14.

The multilayer capacitor according to the present exemplary embodiment may be manufactured by simultaneously stacking internal electrodes.

Figure 6:
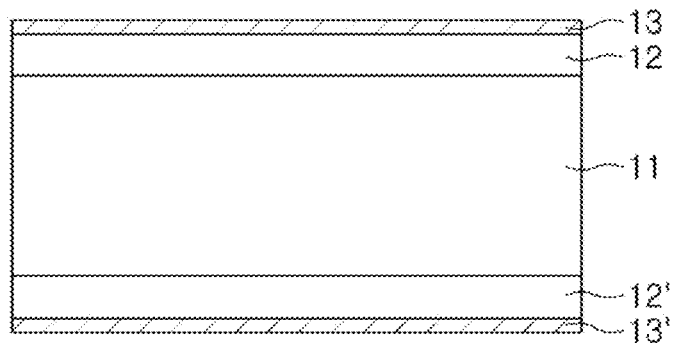
FIGS. 6 through 14 are cross-sectional views sequentially illustrating a manufacturing method of a multilayer capacitor according to the present disclosure.

An internal electrode may be patterned using copper foil as illustrated in FIG. 6.

The copper foil 10 may include a resin layer 11, a carrier layer 12 disposed on one surface of the resin layer 11, and a seed layer 13 disposed on one surface of the carrier layer 12.

The resin layer 11 may be formed of polypropylene glycol (PPG), or the like, and the carrier layer 12 and the seed layer 13 may be formed of copper.

As an example, the thickness of the carrier layer 13 may be about 18 µm, and the thickness of the seed layer 13 may be about 5 µm and thinner than the carrier layer 12. However, the thicknesses of the carrier layer 12 and the seed layer 13 are not limited thereto.

The copper foil 10 may be formed in a double copper foil structure in which a carrier layer 12' and a seed layer 13' are further disposed on the other surface of the resin layer 11, such that after cutting the resin layer 11 in a horizontal direction, double-sided patterning of internal electrode may be performed.

Performing the double-sided patterning of the internal electrode using double copper foil as described above may decrease the lead time (L/T) and cost per unit area.

Figure 7:
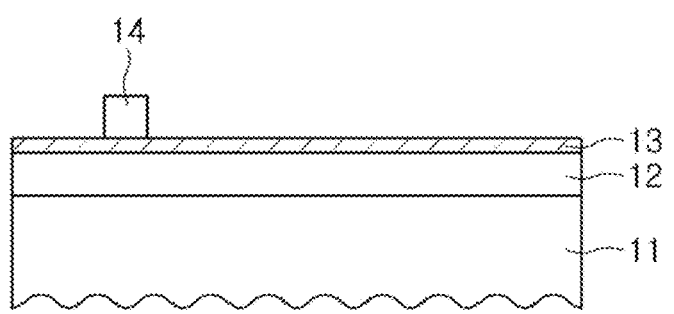
Figure 8:
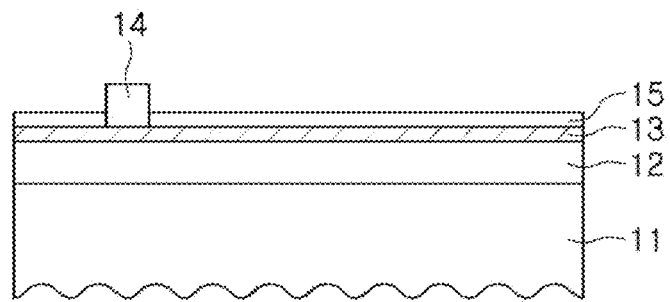

Referring to FIGS. 7 and 8, the patterning of the internal electrode may include laminating a photosensitive film 14 on the seed layer 13, exposing the laminated photosensitive film 14 to form an image, developing the photosensitive film, plating a metal layer 15 on the seed layer 13, and stripping the photosensitive film 14.

In a lithography method used in the patterning of the internal electrode according to the present disclosure, the internal electrode may be formed in a range in which a resolution of an exposure device is within ±1 µm. Accordingly, when forming the internal electrodes using the lithography method as described above and the plating method, the shape of the electrode may be accurately defined, and the printing area distribution and coverage may be improved, as compared to an internal electrode using the printing method according to the related art.

The exposure may be performed using a contact exposure device, a laser direct imaging (LDI) device, a projection exposure device, a stepper, and the like.

The plating may be performed by electrolytic copper plating, electroless copper plating, or the like. Plating may be performed using a metal other than copper.

Dielectric characteristics of the multilayer capacitor may be formed by the overlapping area between the first and second internal electrodes disposed in the thickness direction.

According to the present exemplary embodiment, in order to allow an interlayer align of the first and second internal electrodes to be within ±10 µm, the first internal electrode may be formed to be 10 µm larger than the second internal electrode in one direction.

Therefore, the interlayer align of all of the layers of a capacitor body may be within ±10 µm, such that the capacitance deviation of the multilayer capacitor may be controlled to be within ±1.7%.

Since the dummy electrodes are used as seeds for forming the external electrodes in the present exemplary embodiment, patterning images of the internal electrodes may be changed depending on a shape of the external electrodes.

Figure 9:
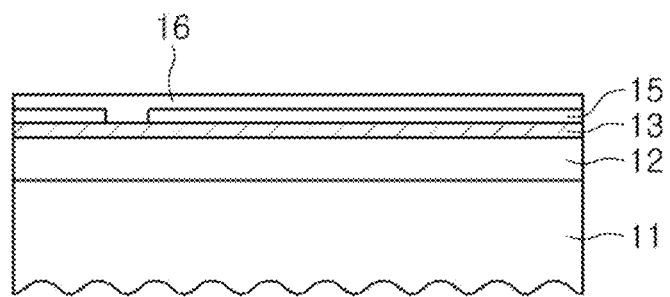

As illustrated in FIG. 9, a dielectric film may be laminated on the seed layer 13 on which the internal electrode 15 is formed by a patterning method of the internal electrode, thereby forming a dielectric layer 16.

Since the internal electrode is formed by the metal layer used in the patterning of the internal electrode, the same reference numeral 15 is used to designate the internal electrode.

The dielectric film may be formed of a composite material composed of a resin and a magnetic filler.

An epoxy, active ester, cyanate ester, acrylate, and the like may be used as the resin.

As the filler, $CaZrO_3$, $BaTiO_3$, $(Ca,Sr)(Ti,Zr)O_3$, $BaO$—$TiO_2$—$Nd_2O_3$, $CaTiO_3$—$MgTiO_3$, and the like, may be used.

The dielectric film may have a dielectric constant (Dk) of 3 to 50 and a dissipation factor (Df) of 0.01 to 0.001.

The dielectric film as described above may be laminated using, for example, a vacuum laminator.

The thickness distribution of the dielectric layer 16 may be a standard deviation (std) of 0.65 µm or so.

After the dielectric layer 16 is formed, viscosity control of the dielectric layer 16 may be further performed.

The viscosity control may be performed using various methods depending on curing reactivity of the resin.

For example, when the dielectric film contains photo-curable resin, a UV-curing method may be performed, and when the dielectric film contains a heat-reactive resin, a heat-curing method may be performed.

The UV-curing or heat-curing method may be performed so that the viscosity of $10^4$ Pa*s or more is maintained.

The dielectric film with viscosity adjusted by the above-mentioned method has a curing degree of about 50% or so, and a state of the dielectric film having the curing degree as described above is referred to as a semi-cured state.

When the viscosity of the dielectric film is adjusted as described above, thickness distribution of the dielectric layer by compression/sintering fixation according to the related art may be improved, and a thickness deviation of the dielectric layer by a resin flow increase may be controlled.

In the multilayer capacitor using the printing method according to the related art, the thickness deviation (std) of dielectric layers may be 0.95 µm or so. But in the multilayer capacitor according to the present exemplary embodiment, the thickness deviation (std) of the dielectric layers may be 0.65 µm or so. Therefore, the capacitance deviation of the multilayer capacitor may be controlled to be within ±7% by decreasing the thickness deviation of the dielectric layers as described above.

Figure 11A:
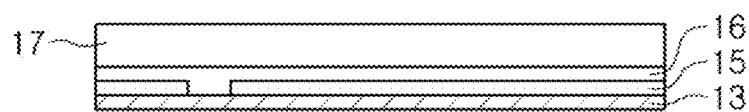
Figure 11B:
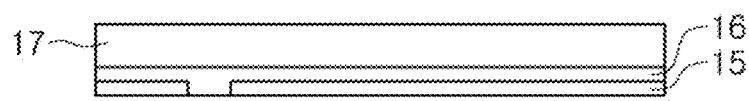

When formation of the internal electrode and the dielectric layer is completed, the resin layer 11, the carrier layer 12, and the seed layer 13 may be detached from the copper foil 10 to thereby be removed as illustrated in FIGS. 11A and 11B.

A combined body of the internal electrode 15 and the dielectric layer 16 formed as described above may be referred to as a laminated sheet, and the laminated sheet may be formed to have a thickness of 1 to 50 µm depending on a product.

Figure 10:
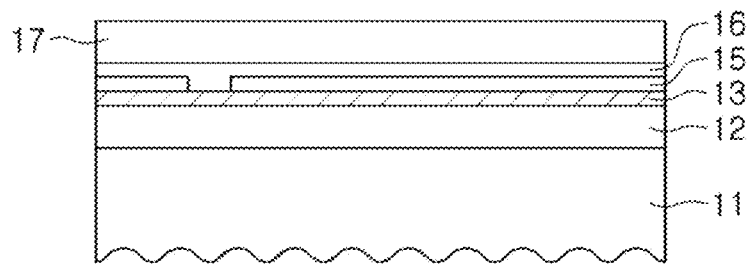

When the laminated sheet is detached from the copper foil 10 or the seed layer is removed, the laminated sheet may be damaged. Therefore, as illustrated in FIG. 10, a mask layer 17 may be formed on the dielectric layer 16 of the laminated sheet in advance. The mask layer 17 may serve to prevent the laminated sheet from being damaged at the time of detaching the copper foil 10 or removing the seed layer from the laminated sheet.

In order to form the mask layer as described above, a back mask may be attached using a vacuum laminator or roll laminator.

The back mask may be manufactured in a three-layer structure composed of, for example, a release film, an adhesion film, and a carrier.

The release film may be formed of polyethylene terephthalate (PET), biaxially oriented polypropylene (BOPP), polyethylene (PE), and the like.

The adhesion film may be formed of a para film, ethylene vinyl acetate (EVA), thermoplastic polyurethane, or the like.

In order to remove the seed layer 13, a hydrogen peroxide-sulfuric acid type wet-etching method may be used, for example.

Figure 12:
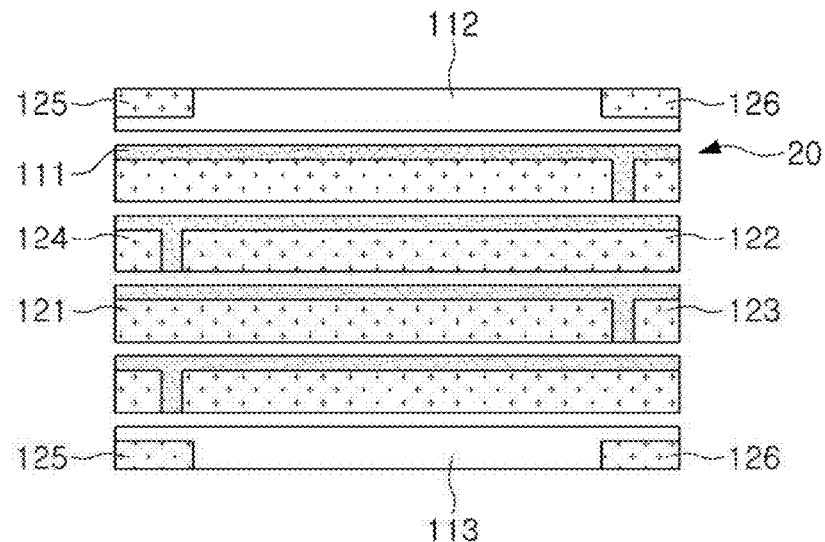
Figure 13:
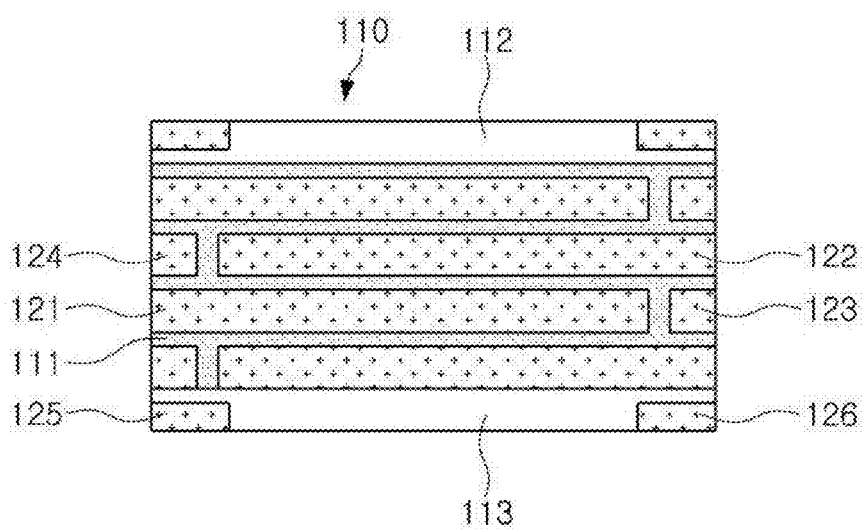

As illustrated in FIGS. 12 and 13, a plurality of laminated sheets may be simultaneously stacked.

Although the laminated sheets, from each of which the mask layer of FIGS. 11A and 11B is removed, are used in FIG. 12, the thicknesses of the internal electrodes and the dielectric layers are adjusted so as to correspond to the shape illustrated in FIG. 2.

Reference numeral 15 in FIGS. 11A and 11B may correspond to reference numerals 121 to 124 in FIG. 12. Reference numeral 16 in FIGS. 11A and 11B may correspond to reference numeral 111 in FIG. 12.

Additionally, covers 112 and 113 protecting the internal electrodes 121 and 122, the dummy electrodes 123 and 124, and the dielectric layers 111 may be further stacked on upper and lowermost portions of the multilayer capacitor.

These covers 112 and 113 may be formed using cover films and a vacuum laminator. Dummy electrodes 125 and 126 may be formed in the covers.

The cover film, which is a material composed of a resin and inorganic filler, may reinforce rigidity of the capacitor body.

Thickness distribution of the covers 112 and 113 may be equivalent to thickness distribution of the dielectric layers 111.

The cover film may be formed of the same material as that of the dielectric layer, or a different material from that of the dielectric layers as needed, and a cured product of the cover film may have a modulus of 3 GPa or more.

In the simultaneous stacking method as described above, alignment stacking may be performed for interlayer align. In order to completely cure the plurality of laminated sheets 20 in the semi-cured state, curing may be performed using vacuum (V)-press equipment.

The V-press equipment may be used under a vacuum atmosphere in order to remove volatile ingredients generated at the time of curing resins. The pressure and temperature may be controlled for interlayer compression and complete curing.

The vacuum level may be 50 torr or less, the pressure may be in a range of 10 to 150 kgf/cm$^2$, and the temperature may be generally in a range of 100 to 300° C. However, the temperature may be changed depending on resin curing characteristics of the dielectric layers.

Because the internal electrodes and alignment pattern marks are simultaneously formed in the interlayer align method, the pattern mark may represent 100% of the internal electrode.

Process capability of alignment stacking equipment may be within an alignment of ±5 μm. In consideration of deformation of the laminated sheets, the capacitor may be manufactured so that an alignment of the all of the layers of the internal electrodes may be within ±10 μm.

The interlayer align of all of the layers of the capacitor body may be within ±10 μm as described above, such that the capacitance deviation of the multilayer capacitor may be controlled to be within ±1.7%.

The simultaneously stacked and cured product may be diced depending on a size of a passive component, and polished.

Because a position recognizing mark for the dicing is formed simultaneously with the internal electrode and the alignment pattern mark, the position recognizing mark may represent 100% of the internal electrode.

The dicing may be performed so that a dicing margin is within ±10 μm by using the pattern mark in consideration of a mechanical error of equipment and an interlayer align of the compressed product.

In order to allow the internal electrodes and external electrode to smoothly contact each other and prevent a chipping phenomenon of edges of the chip diced as described above, the surfaces and edge portions of the chip may be further polished.

The polishing method may be performed by the same manner as in a polishing method of a general multilayer capacitor.

Figure 14:
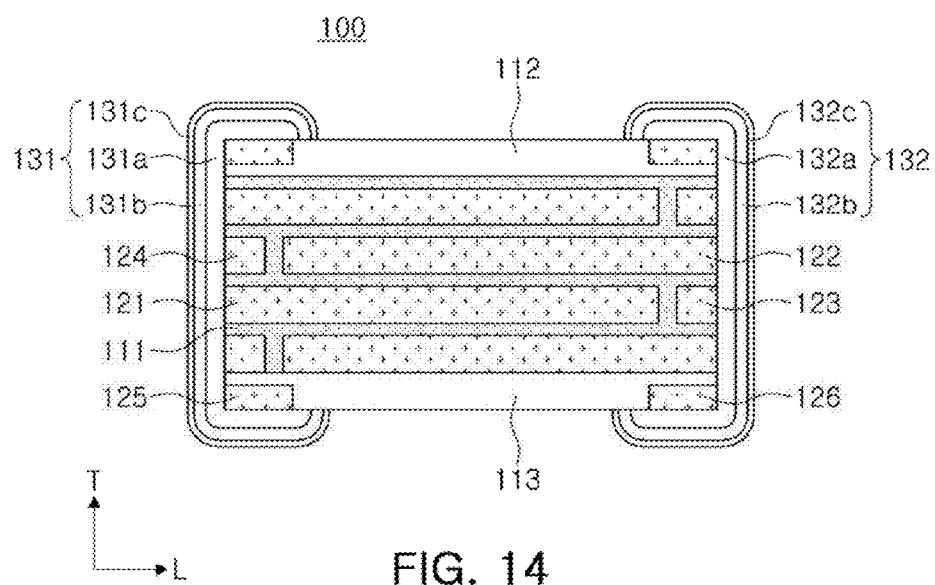

As illustrated in FIG. 14, external electrodes 131 and 132 may be formed on the body 110.

The external electrodes 131 and 132 may be formed by an electroplating method, which may be a copper (Cu)/nickel (Ni)/tin (Sn) electroplating method.

The copper plating method may be a plating spread method, and, the dummy electrodes 123 and 124 formed together with the internal electrodes at the time of patterning the internal electrodes may be used as seeds for spread plating.

Further, in consideration of process capability of a spread electroplating method, the seeds may be manufactured so that the distance between the seeds is 10 μm or less.

According to the present exemplary embodiment, since at the time of forming the external electrodes, the seed electrodes formed together with the internal electrodes at the time of patterning the internal electrodes are used, there is no need to form separate seed layers, and miniaturization may be implemented, which is advantageous for forming a small sized capacitor.

The external electrodes may be formed in a cap shape similarly to a 2-terminal multilayer capacitor as in the present exemplary embodiment, or a "C" or "L" shape as in the modified exemplary embodiments, depending on formation positions of the dummy electrodes, the seeds for external electrode spread plating.

When the external electrodes are formed in the "L" shape, external electrodes on the opposing side surfaces of the body in the width direction are omitted, such that an area of pads of the board may be decreased. Therefore, the mounting area may be decreased, and the risk of a short circuit by misprinting of solder at the time of packaging may be decreased. Accordingly, microcomponents may be highly integrated.

When the multilayer capacitor is manufactured by the litho and plating method and the simultaneous stacking method, the area and thickness distribution of the dielectric layers may be easily controlled as compared to the multilayer capacitor having the internal electrodes formed by the printing method according to the related art. As such, the capacitance may be implemented with a narrow deviation, and a yield may be 93% based on the B deviation (within ±0.1 pF). Furthermore, forming the external electrodes by plating may solve a short circuit problem at the time of applying a surface mounting technology (SMT).

As set forth above, according to exemplary embodiments in the present disclosure, the area distribution and thickness distribution of the dielectric layers may be easily controlled, and thus capacitance may be implemented with a narrow deviation as compared to the multilayer capacitor of which internal electrodes are formed using a printing method according to the related art. In addition, the external electrodes are formed by plating, such that the short circuit problem at the time of applying the SMT may be solved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
   a body including dielectric layers and first and second internal electrodes alternately stacked with the dielectric layers interposed therebetween, wherein the first and second internal electrodes are respectively exposed to first and second end surfaces of the body opposite each other in a length direction; and
   first and second external electrodes on the first and second end surfaces of the body and respectively connected to the first and second internal electrodes,
   wherein the first and second internal electrodes are plating layers and the first internal electrode plating layers are wider than the second internal electrode plating layers in a width direction orthogonal to the length direction.

2. The multilayer capacitor of claim 1, wherein the body is formed by simultaneously stacking the dielectric layers and the first and second internal electrodes.

3. The multilayer capacitor of claim 1, wherein the first and second external electrodes each include a plating layer.

4. The multilayer capacitor of claim 1, further comprising a plurality of dummy electrodes formed in the body, exposed at at least one surface of the body, and connected to the first and second external electrodes, respectively.

5. The multilayer capacitor of claim 1, wherein the body includes an active region including the first and second internal electrodes and covers on outermost portions of the active region, and
   the multilayer capacitor further comprises a plurality of dummy electrodes in the covers, exposed at at least one surface of the body, and connected to the first and second external electrodes, respectively.

6. The multilayer capacitor of claim 1, wherein the body has first and second surfaces opposing each other, third and fourth surfaces connected to the first and second surfaces and opposing each other, and fifth and sixth surfaces connected to the first and second surfaces and the third and fourth surfaces and opposing each other,
   the first and second internal electrodes are exposed at the third and fourth surfaces, respectively,
   the first external electrode extends from the third surface to portions of the first and second surfaces and portions of the fifth and sixth surfaces and is connected to exposed end portions of the first internal electrodes, and
   the second external electrode extends from the fourth surface to portions of the first and second surfaces and portions of the fifth and sixth surfaces and is connected to exposed end portions of the second internal electrodes.

7. The multilayer capacitor of claim 6, further comprising:
   a first dummy electrode on the dielectric layer on which the first internal electrode is disposed and exposed at at least one of the fourth, fifth, and sixth surfaces;
   a third dummy electrode on the dielectric layer on which the first internal electrode is disposed and exposed at the third or fifth surface;
   a fourth dummy electrode on the dielectric layer on which the first internal electrode is disposed and exposed at the third or sixth surface;
   a second dummy electrode on the dielectric layer on which the second internal electrode is disposed and exposed at at least one of the third, fifth, and sixth surfaces;
   a fifth dummy electrode on the dielectric layer on which the second internal electrode is disposed and exposed at the fourth or fifth surface;
   a sixth dummy electrode on the dielectric layer on which the second internal electrode is disposed and exposed at the fourth or sixth surface.

8. The multilayer capacitor of claim 1, wherein the body has first and second surfaces opposing each other, third and fourth surfaces connected to the first and second surfaces and opposing each other, and fifth and sixth surfaces connected to the first and second surfaces and the third and fourth surfaces and opposing each other,
   the first and second internal electrodes are exposed at the third and fourth surfaces, respectively,
   the first external electrode extends from the third surface to portions of the first and second surfaces and is connected to exposed end portions of the first internal electrodes, and
   the second external electrode extends from the fourth surface to portions of the first and second surfaces and is connected to exposed end portions of the second internal electrodes.

9. The multilayer capacitor of claim 8, further comprising:
   a first dummy electrode exposed at the fourth surface on the dielectric layer on which the first internal electrode is disposed; and
   a second dummy electrode exposed at the third surface on the dielectric layer on which the second internal electrode is disposed.

10. The multilayer capacitor of claim 1, wherein the body has first and second surfaces opposing each other, third and fourth surfaces connected to the first and second surfaces and opposing each other, and fifth and sixth surfaces connected to the first and second surfaces and the third and fourth surfaces and opposing each other,
    the first internal electrode has a first lead portion exposed at the first and third surfaces,
    the second internal electrode has a second lead portion exposed at the first and fourth surfaces,
    the first external electrode extends from the first surface to a portion of the third surface and connected to the first lead portion, and the second external electrode is spaced apart from the first external electrode, extends from the first surface to a portion of the fourth surface, and connects to the second lead portion.

11. The multilayer capacitor of claim 10, further comprising:
a first dummy electrode exposed at the first and fourth surfaces on the dielectric layer on which the first internal electrode is disposed; and
a second dummy electrode exposed at the first and third surfaces on the dielectric layer on which the second internal electrode is disposed.

12. The multilayer capacitor of claim 1, wherein the first and second internal electrodes each have a roughness (Ra) of 0.05 μm or less.

13. A manufacturing method of a multilayer capacitor, the manufacturing method comprising: preparing a plurality of laminated sheets each including a first or second internal electrode, one or more dummy electrodes, and a dielectric layer, wherein the first internal electrodes are wider than the second internal electrodes in a first direction; simultaneously stacking, and then curing, alternating ones of the plurality of laminated sheets including the first internal electrodes and the plurality of laminated sheets including the second internal electrodes, and covers on and below the laminated sheets, to prepare a cured product, wherein the first direction of the first internal electrodes and the second internal electrodes are aligned with each other in the cured product; dicing the cured product depending on a size of the capacitor to prepare a body where the first and second internal electrodes and the dummy electrodes are partially exposed at opposite ends in a second direction orthogonal to the first direction; and forming external electrodes on external surfaces of the body using the dummy electrodes as seeds in a plating method.

14. The manufacturing method of claim 13, wherein the preparing of the laminated sheets includes:
patterning the first and second internal electrodes and the dummy electrodes on a surface of copper foil by a lithography method and a plating method;
forming the dielectric layer to cover the first and second internal electrodes and the dummy electrodes; and
removing the copper foil.

15. The manufacturing method of claim 14, wherein the preparing of the laminated sheets further includes, after the forming of the dielectric layer, controlling a viscosity of the dielectric layer.

16. The manufacturing method of claim 14, wherein the preparing of the laminated sheets further includes, before the removing of the copper foil, forming a mask layer to cover the dielectric layer.

* * * * *